No. 666,475. Patented Jan. 22, 1901.
H. G. DUNSTON.
AUTOMATIC CAR COUPLING.
(Application filed May 4, 1899.)
(No Model.)
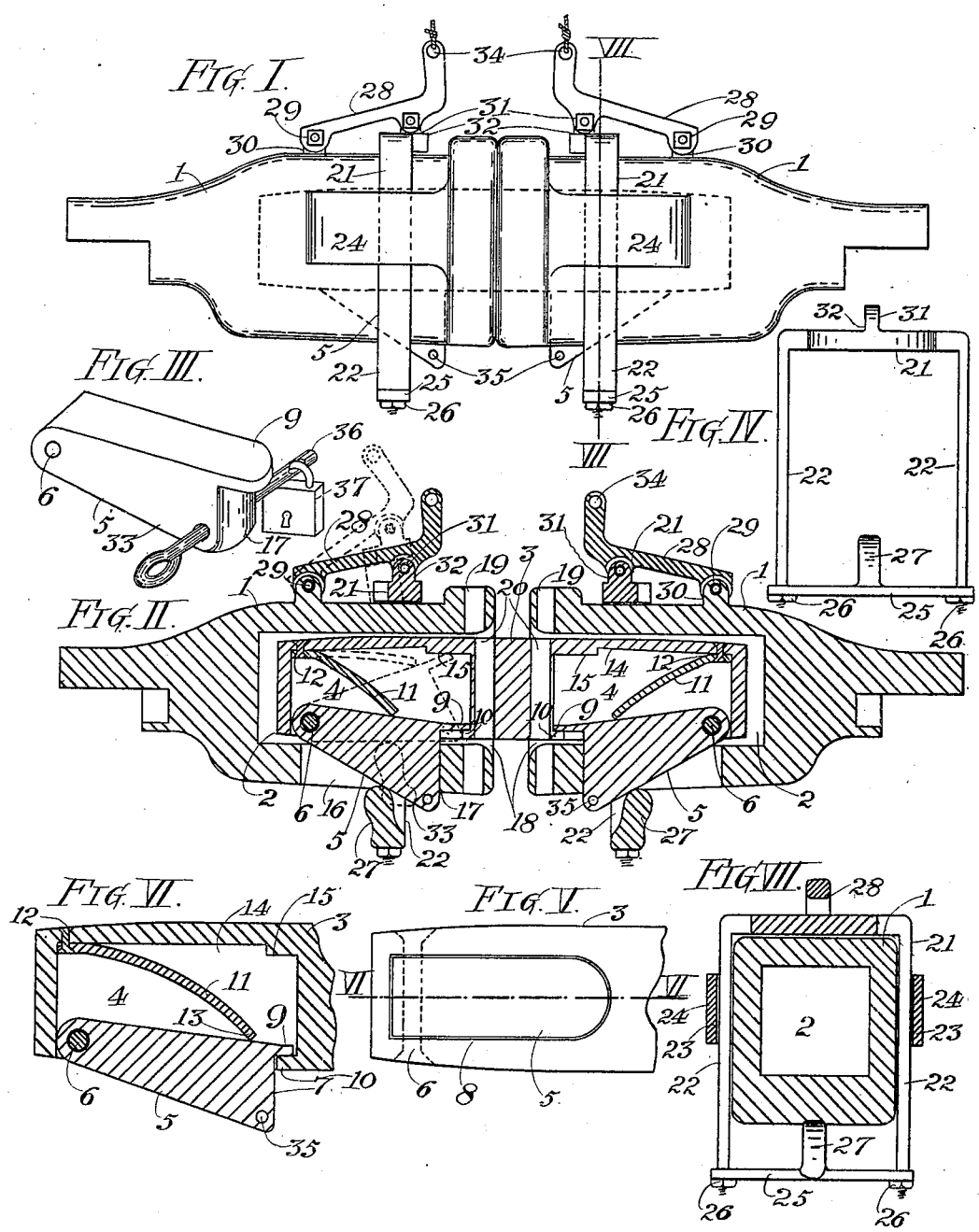

UNITED STATES PATENT OFFICE.

HORACE GREELY DUNSTON, OF SANTA MONICA, CALIFORNIA.

AUTOMATIC CAR-COUPLING.

SPECIFICATION forming part of Letters Patent No. 666,475, dated January 22, 1901.

Application filed May 4, 1899. Serial No. 715,633. (No model.)

*To all whom it may concern:*

Be it known that I, HORACE GREELY DUNSTON, a citizen of the United States, with residence and post-office address at 120 Second street, Santa Monica, county of Los Angeles, and State of California, have invented certain new and useful Improvements in Automatic Car-Couplings, of which the following is a full, clear, and exact description, reference being had to the accompanying drawings, which form a part of this specification.

My invention relates to improvements in automatic car-couplers; and my invention consists in certain features of novelty hereinafter described and claimed.

Figure I represents a side elevation of two draw-bars coupled with my improved invention. Fig. II is a longitudinal vertical section of Fig. I. Fig. III is a perspective view of the coupling-dog. Fig. IV is a front elevation of the stirrup for raising the coupling-dog. Fig. V is a detail bottom view of the coupling-link. Fig. VI is a longitudinal section taken on line VI VI, Fig. V. Fig. VII is a transverse section taken on line VII VII, Fig. I.

As the draw-bars and their various parts are in duplicate, the description of one draw-bar and its parts will suffice for both.

1 represents the draw-bars, which are provided with chambers 2 for the reception of the coupling-link 3. The coupling-link 3 is provided with chambers 4 at its respective ends.

5 represents coupling-dogs pivoted at 6 within the chambers 4 of the link 3, said dogs being preferably somewhat triangular in shape and resting normally partially within the chamber 4 and having bearing-faces 7, which extend from said chamber 4 out through a slot 8, leading from the chamber.

9 represents lips on the dogs, said lips limiting the downward movement of the dogs by coming in contact with a flange 10 on the link. The dogs remain normally in the position shown in Fig. VI and in full lines in Fig. II, but are capable of being raised up within the chamber 4, as shown by dotted lines in Fig. II.

11 represents springs having one of their ends secured at 12 to the link within the chamber 4 and their opposite ends resting at 13 upon the upper side of the dog 5. As the dogs are thrown upwardly within the chamber 4, as shown in dotted lines, Fig. II, the spring 11 is bent upwardly, pressing against the dogs and throwing them downwardly when pressure has been relieved from the lower side of the dogs.

14 represents a recess at the top of the chamber 4, into which the spring 11 may recede as the dogs are thrown upwardly in order to prevent breakage of the same, the lip 9 of the dog coming in contact with the under face of a shoulder 15 at the forward end of the chamber 4, thus preventing further contraction of the spring 11.

16 represents a slot on the under side of the draw-bar, into which the dog 5 drops when the draw-bars are coupled together, the face 7 of the dog coming in contact with the wall 17 of the slot 16 at its forward end, thus forming a bearing for the dog for pulling the car. As the coupling-link 3 is forced through the mouth 18 of the draw-bar into the chamber 2 the dog is thrown upward, as shown in dotted lines, Fig. II, and when it has passed a sufficient distance into the chamber it drops into the slot 16 of the draw-bar, thus completing the coupling. The draw-bar is also provided with a coupling-pin hole 19 and the link with a hole 20, in which a coupling-pin may be inserted to form a coupling in case of any accident to the improved coupling device or if for any reason it should be found desirable to temporarily use the ordinary coupling-link.

Having described my improved means for forming a coupling, I will now describe the manner of uncoupling.

21 represents a stirrup that straddles the draw-bar, with its side members 22 passing through slots 23 in bosses 24 on the sides of the draw-bars, a guide being thus formed for the stirrup, the bosses also forming a protecting medium for the stirrup.

25 represents a cross-bar secured at 26 to the lower ends of the side members 22 of the stirrup, said bar having at its center a lug 27.

28 represents a lever pivoted at 29 to a stud 30 on top of the draw-bar, said lever 28 being also pivoted at 31 to a lug 32 on the top of the stirrup 21. As the lever 28 is forced upwardly and backwardly, as shown in dotted lines in Fig. II, the lug 27 comes in contact with the inclined face 33 on the lower side of the dog 5. The dog being thus forced upwardly into the chamber 4 of the link permits the link to be drawn from the chamber 2 of the draw-bar, the car thus being uncoupled.

34 represents a hole in the lever 28, by which connection may be had with the necessary rod or other device for uncoupling the car from the top or side of the same.

35 represents a hole in the lower end of the dog 5, through which a pin 36 may be inserted and a padlock 37 connected therewith in case it is found desirable at any time to lock the coupler against manipulation by unauthorized parties.

I claim as my invention—

1. As a new article of manufacture, a link for coupling cars having a central portion with chambers in its respective ends, slots formed in the bottom of said chambers, dogs pivoted in said chambers and adapted to extend outwardly through said slots, and springs for holding the dogs in their outwardly-extended position, substantially as set forth.

2. As a new article of manufacture, a link for coupling cars having chambers in its respective ends, slots formed in the bottom of said chambers, dogs pivoted in said chambers and adapted to extend through the slots, lips on the dogs extending beyond the slots, and flanges with which said lips come in contact to limit the outward travel of the dogs, substantially as set forth.

3. As a new article of manufacture, a car-coupling link having chambers in its respective ends, slots formed in the bottom of said chambers, dogs pivoted in said chambers over the slots, springs adapted to bear against said dogs, recesses formed in the chamber into which the springs recede, lips on the dogs extending beyond the slots and shoulders on the link for limiting the inward movement of said dogs, substantially as set forth.

4. In a car-coupler, the combination of draw-bars having chambers, a coupling-link having chambers in its respective ends with slots leading to said chambers, dogs pivoted in said chambers, a stirrup straddling the draw-bar and means for raising said stirrup and the dogs, substantially as set forth.

5. In a car-coupler, the combination of the draw-bars, a coupling-link having chambers in its respective ends with slots leading to said chambers, dogs pivoted in said chambers a stirrup straddling the draw-bar and adapted to engage the lower face of the dog, and a lever connected with said stirrup for raising the dog, substantially as set forth.

6. In a car-coupler, the combination of the draw-bars, a link having chambers, slots leading to the chambers, the pivoted dogs, the stirrups, lugs on the stirrups engaging the dogs and a lever having pivotal connection with the stirrup and draw-bar for raising said dog, substantially as set forth.

HORACE GREELY DUNSTON.

Witnesses:
CHAS. M. LINDSEY,
AUGUST M. GUIDINGER.